March 15, 1938. W. L. MORRISON 2,111,434
AUTOMOBILE BODY
Filed Jan. 6, 1934 6 Sheets-Sheet 1

Inventor:
Willard L. Morrison,
By Parker & Carter Attys.

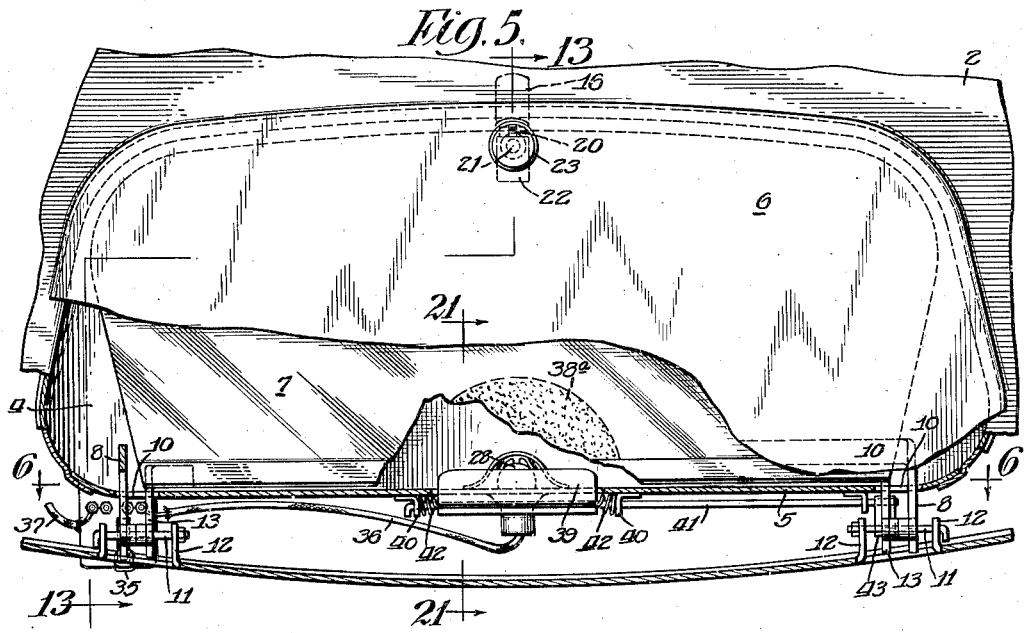
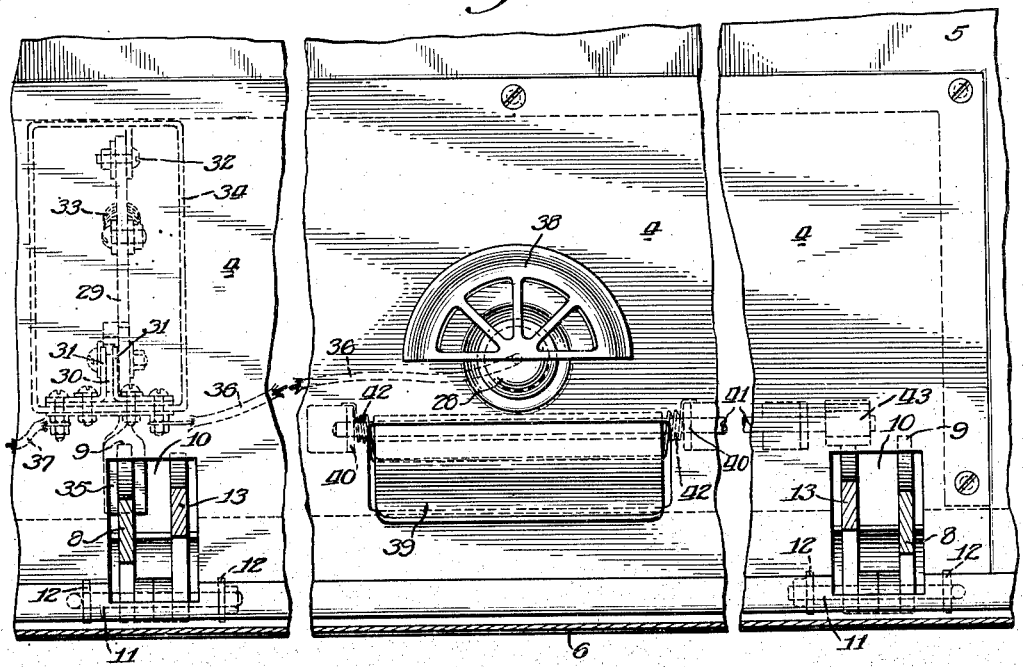

March 15, 1938. W. L. MORRISON 2,111,434
AUTOMOBILE BODY
Filed Jan. 6, 1934 6 Sheets-Sheet 3
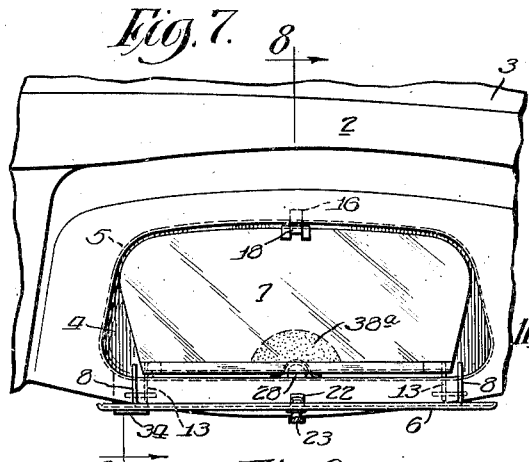
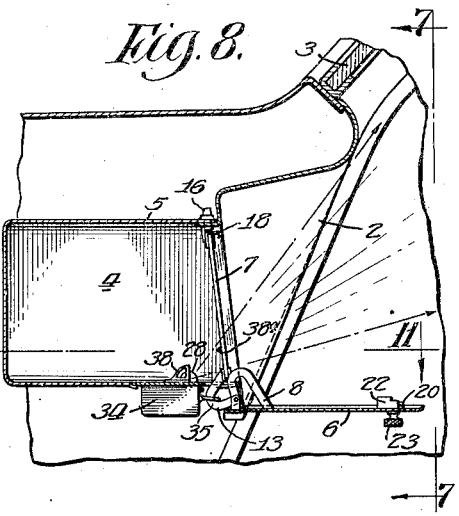
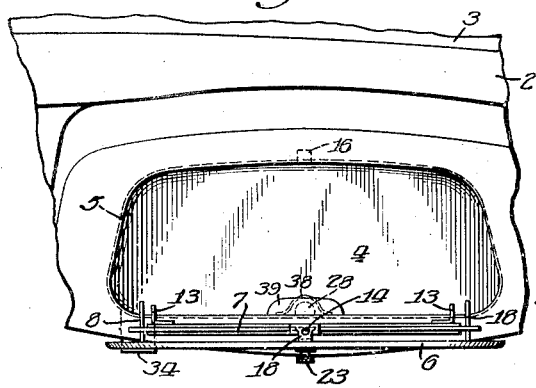
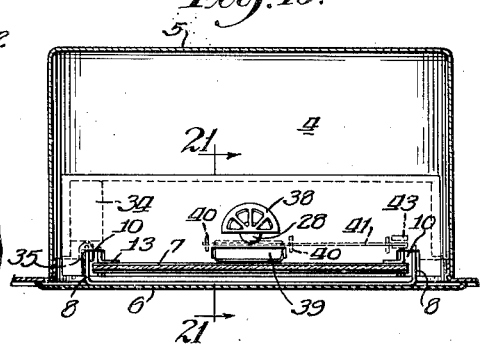
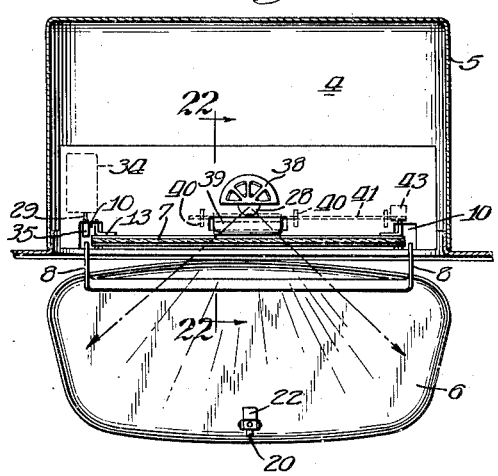
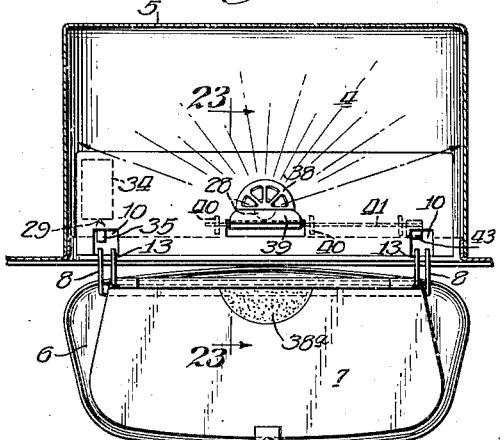
Inventor:
Willard L. Morrison,
By Parker & Carter Attys.

March 15, 1938. W. L. MORRISON 2,111,434
AUTOMOBILE BODY
Filed Jan. 6, 1934 6 Sheets-Sheet 4
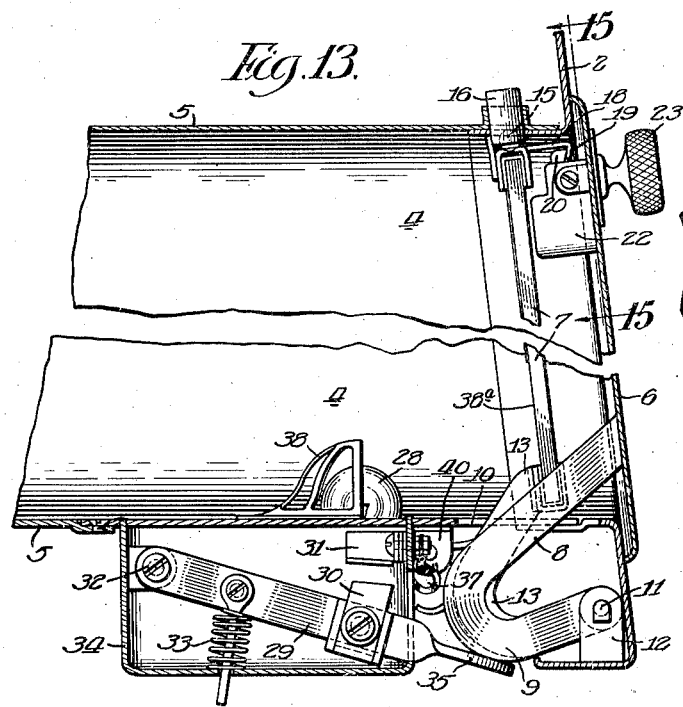
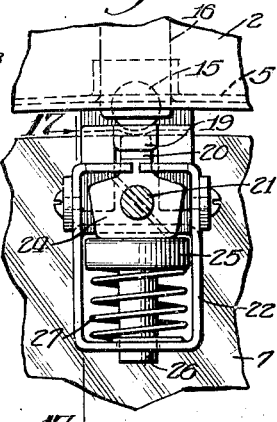
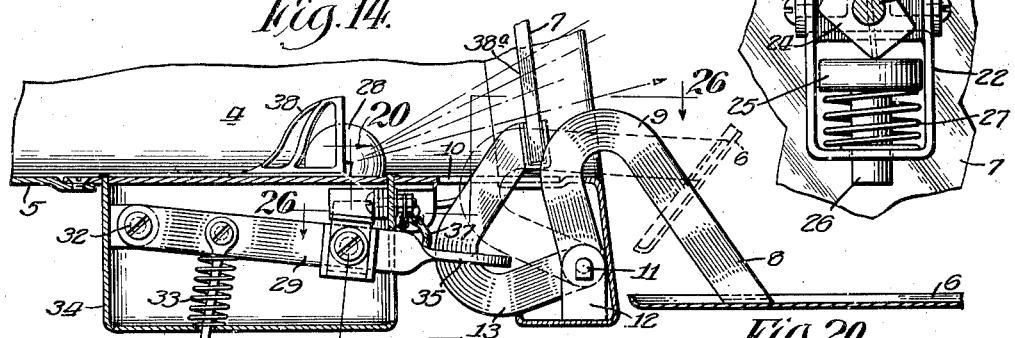
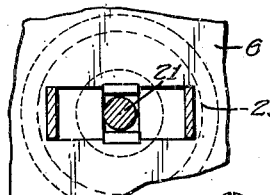
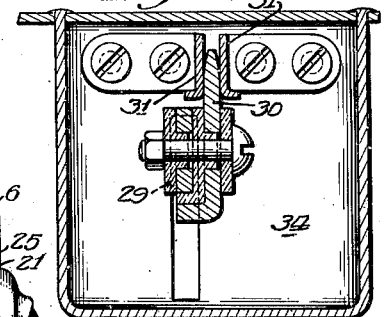
Inventor:
Willard L. Morrison,
By Parker & Carter Attys.

March 15, 1938.　　W. L. MORRISON　　2,111,434
AUTOMOBILE BODY
Filed Jan. 6, 1934　　6 Sheets-Sheet 5

Inventor:
Willard L. Morrison,
By Parker & Carter Attys.

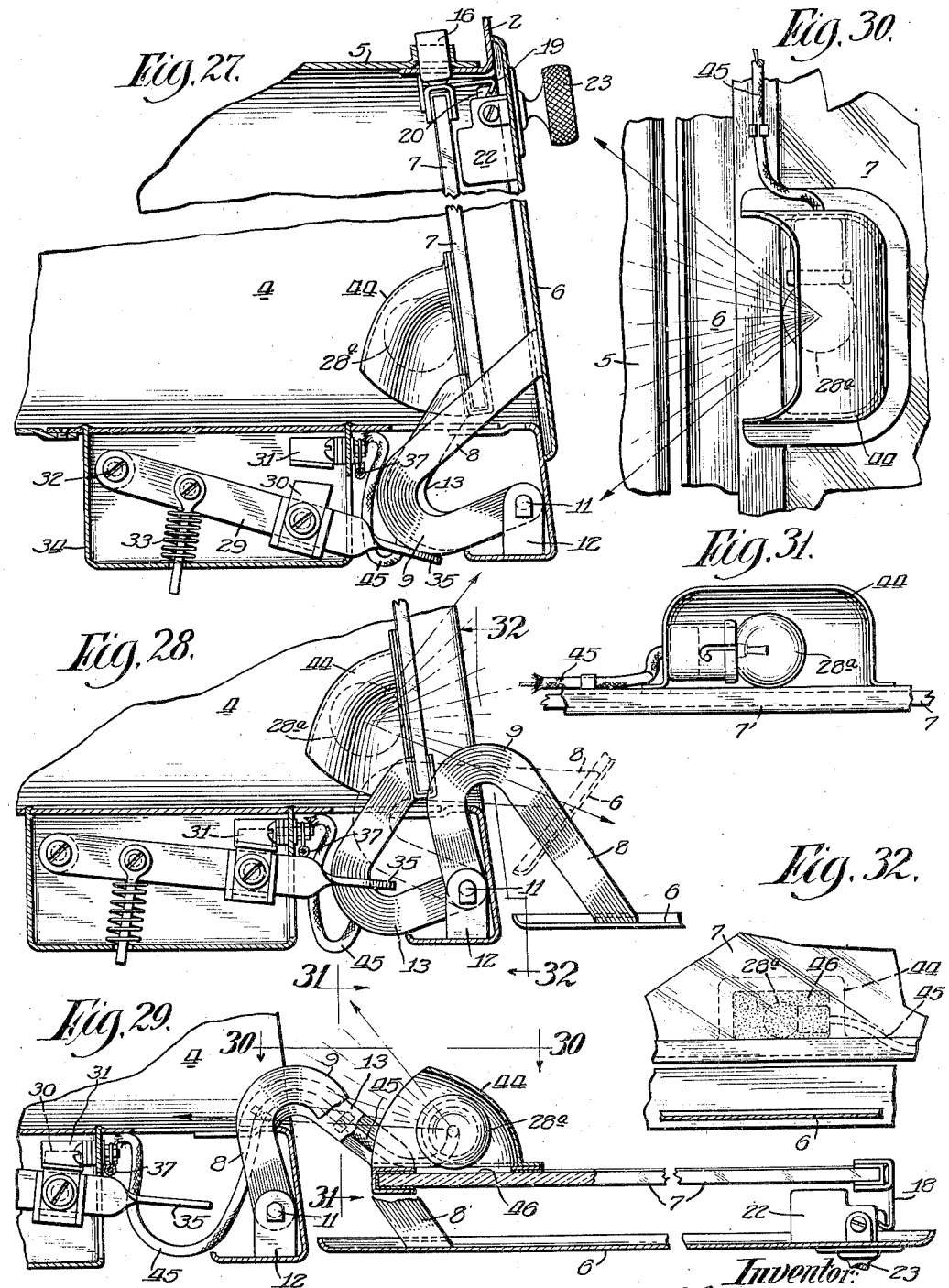

Patented Mar. 15, 1938

2,111,434

UNITED STATES PATENT OFFICE 2,111,434

AUTOMOBILE BODY

Willard L. Morrison, Lake Forest, Ill.

Application January 6, 1934, Serial No. 705,481

11 Claims. (Cl. 206—19.5)

This invention relates to improvements in automobile bodies and has for its object to provide a new and improved device of this description. The invention has as a further object to provide an automobile body having a pocket in the dash or panel board with a mirror therein which is ordinarily concealed but which may be easily and quickly brought into operative position. The invention has as a further object to provide a body with such a pocket wherein there is a light which is lighted when the mirror is brought into operative position. The invention has other objects which are more particularly pointed out in the accompanying description.

Referring now to the drawings, Fig. 1 is a view showing an automobile having a body embodying one form of the invention;

Fig. 2 is an enlarged sectional view taken on line 2—2 of Fig. 1;

Fig. 3 is an enlarged sectional view taken on line 3—3 of Fig. 2 showing the pocket closed;

Fig. 4 is a view similar to Fig. 3 showing the pocket open;

Fig. 5 is a front view of the pocket with parts broken away;

Fig. 6 is a sectional view taken on line 6—6 of Fig. 5;

Fig. 7 is a front view of the pocket with the door open and the mirror in operative position, taken on line 7—7 of Fig. 8;

Fig. 8 is a sectional view taken on line 8—8 of Fig. 7;

Fig. 9 is a view taken on line 9—9 of Fig. 4;

Fig. 10 is a sectional view taken on line 10—10 of Fig. 3;

Fig. 11 is a sectional view taken on line 11—11 of Fig. 8;

Fig. 12 is a sectional view taken on line 12—12 of Fig. 4;

Fig. 13 is a sectional view taken on line 13—13 of Fig. 5, showing the switch for the electric light open;

Fig. 14 is a view of the lower part of Fig. 13, showing the switch closed;

Fig. 15 is a sectional view taken on line 15—15 of Fig. 13;

Fig. 16 is a view similar to Fig. 15 with the door latch in latched position to disconnect the door from the mirror;

Fig. 17 is a sectional view taken on line 17—17 of Fig. 15;

Fig. 18 is a sectional view taken on line 18—18 of Fig. 17;

Fig. 19 is a sectional view taken on line 19—19 of Fig. 17;

Fig. 20 is a sectional view taken on line 20—20 of Fig. 14;

Fig. 27 is a sectional view taken through the pocket showing a modified construction;

Fig. 28 is a view similar to Fig. 27 with the door open;

Fig. 29 is a view similar to Fig. 28 showing the mirror adapted to the open door;

Fig. 30 is a sectional view taken on line 30—30 of Fig. 29;

Fig. 31 is a view taken on line 31—31 of Fig. 29; and

Fig. 32 is a view taken on line 32—32 of Fig. 28.

Like numerals refer to like parts throughout the several figures.

Figure 21:
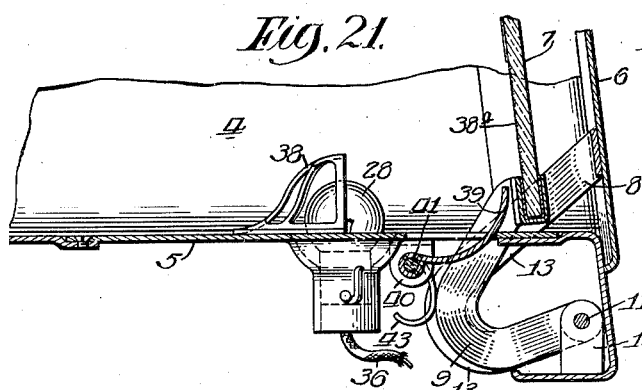
Fig. 21 is a sectional view taken on line 21—21 of Fig. 5.

Referring now to the drawings, I have illustrated in Fig. 1 an automobile having a body 1. This body is provided with a dash or panel board 2 just below the wind shield 3. The panel board is provided with a pocket 4 formed by means of a receptacle 5, the pocket being provided with the door 6. Back of the door and located inside the pocket is a mirror 7. The door is provided with a suitable hinge so that it may be moved to open the pocket, and this hinge is preferably arranged to open and close a switch for a light back of the mirror. In the construction shown the door 6, see Fig. 13, is provided with one or more hinge members 8 connected therewith and which have an inwardly projecting portion 9 extending through a slot 10 in the bottom of the receptacle 5. The hinge member 8 is shown as being bent back upon itself and pivotally connected at 11 with a fixed part 12 attached to the panel board 2. The mirror 7 is provided with a similar hinge member 13 which is pivotally connected, preferably by the same pivot 11, to the panel board.

Figure 25:
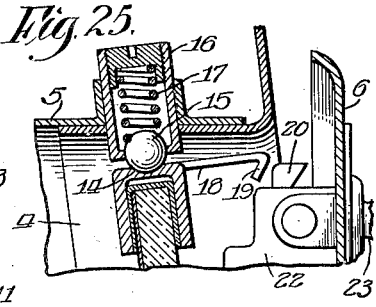
Fig. 25 is a sectional view through the upper end of the mirror showing the holding device therefor.

The mirror 7 is provided with means for maintaining it in its operative position. As herein shown it is provided at its upper edge with a recess 14, see Fig. 25, into which is received a plunger 15 mounted in the casing 16, the plunger being pressed toward the mirror by the spring 17. It will be noted that when the parts are in the position shown in Fig. 25, the mirror will be held in its operative position. The door 6 is preferably arranged so as to be held in its closed position by the same device that holds the mirror in its operative position. For this purpose there is attached to the mirror an engaging member 18 having a hook 19. Connected with the door 6 is a latch member 20 which engages the hook 19, see Figs. 13 and 15. The latch member 20 is connected with a pivot 21 rotatably mounted in a frame 22 and connected with a thumb piece 23. The latch member 20 has a part 24 which projects beyond the pivot 21 and which engages the member 25. This member 25 has a reduced portion 26 surrounded by a spring 27 located between it and the bracket 22. When the thumb piece 23 is rotated, the latch member 20 is disengaged from the hook 19, as seen in Fig. 16, and this permits the door to be moved to its open position, see Fig. 14, at the same time leaving the mirror in its operative position extending across the mouth of the pocket so that the party sitting opposite it may use it. When the thumb piece is released, the spring 27 moves the parts back to their initial position where the latch member 20 engages the hook 19. When the latch member 20 is in engagement with the hook 19, then by pulling the thumb piece 23 both the door and the mirror will be moved to open position, see Fig. 23, leaving the mouth of the pocket open so that articles may be removed from or inserted therein.

I prefer to provide a light back of the mirror and to provide the mirror with a translucent or transparent portion through which the light may pass. This may be done, for example, by omitting the silvering 38a from the lower part of the mirror, as illustrated for example in Figs. 21 and 22. This part of the mirror may be formed to be translucent if desired by being ground. As herein shown I have illustrated a light 28, see Fig. 13, which is on the inside of the pocket. Some means is preferably provided for operating this light so as to light it or put it out. I have illustrated the light as being an electric light. A movable switch member 29 is provided, having a contact 30 adapted to engage the contacts 31 to complete the electric circuit through the lamp, see Figs. 13, 14 and 20.

In the construction shown the switch member 29 is pivoted at 32 and there is a spring 33 which tends to move it and hold it in its closed position. The switch member 29 is preferably located in a casing 34 in proximity to the pocket 4 and is provided with an engaging part 35. When the door 6 is moved to its closed position, see Fig. 13, the projecting part 9 of the hinge member engages the part 35 of the switch member and moves and holds the switch member 29 in its open position, as shown in Fig. 13, so that the light will not be lighted. When the door 6 is moved to its open position the part 9 of the member moves so as to release the switch member 29 and the spring 33 moves it to its closed position to close the circuit and light the light 28, see Fig. 14. The current passes through the conductors 36 and 37, these conductors being connected to the source of supply on the automobile. The lamp is also preferably provided with a guard 38.

Figure 22:
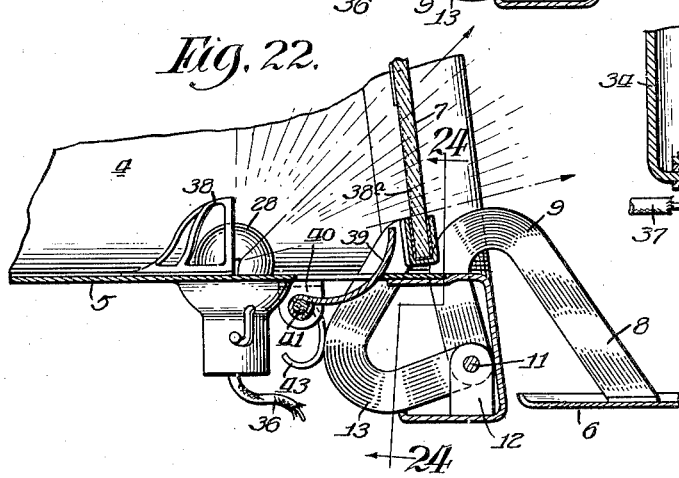
Fig. 22 is a view similar to Fig. 21 showing the door open and the mirror in operative position.
Figure 26:
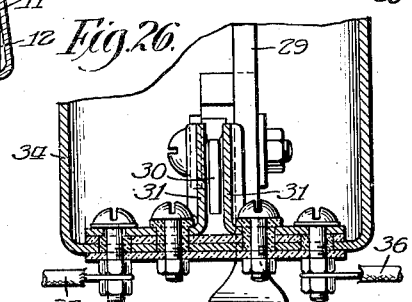
Fig. 26 is a sectional view taken on line 26—26 of Fig. 14.
Figure 23:
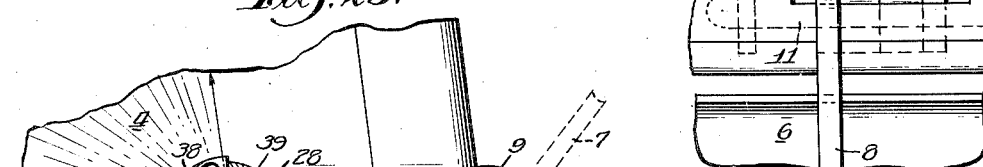
Fig. 23 is a view similar to Fig. 21 showing the door in open position with the mirror connected therewith.
Figure 24:
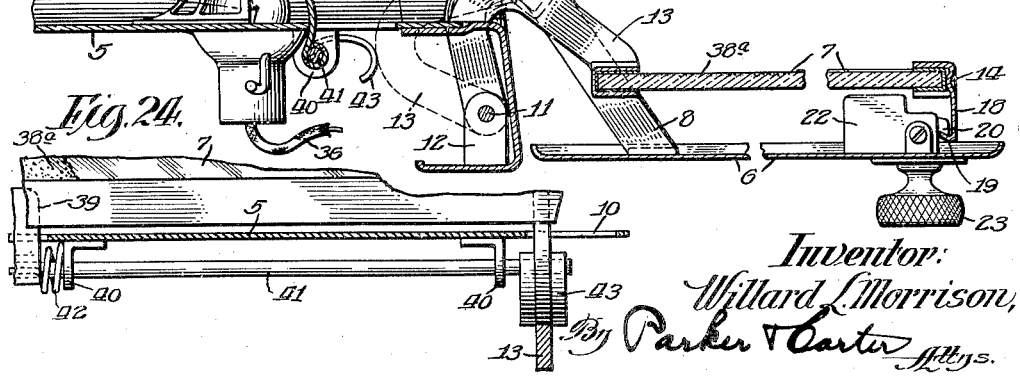
Fig. 24 is a sectional view taken on line 24—24 of Fig. 22.

Some means is also provided for preventing the light from shining directly in the eyes of the occupants of the car when the door and mirror are moved to open positions. As herein shown there is provided a shield 39, see Figs. 21, 22 and 23, pivoted at 40. This shield is provided with some means for moving it to its operative and inoperative position. In the construction shown it is connected with the shaft 41, and there are springs 42 associated with the shaft and with the shield which normally tend to move it to its shielding position, as shown in Fig. 23. There is an actuating member 43 connected with the shield which is engaged by the hinge member 13 of the mirror when the mirror is in its operative position, and which moves the shield to its inoperative position, as shown in Figs. 21 and 22. When the mirror is moved down out of the mouth of the pocket, as shown in Fig. 23, the spring moves the shield to its shielding position as shown in that figure.

In Figures 27 to 32 there is illustrated a modified construction in which the lamp 28a is connected with the mirror and moves with it and is provided with a shield 44 attached to the mirror. The conductor 45 is flexible and passes along the hinge of the mirror and connects with one of the contacts 31 of the switch so that the light will be lighted when the door is opened and extinguished when the door is closed. In this construction the portion 46 of the mirror opposite the light is made transparent or translucent, as shown in Fig. 32. It will be noted that the releasable holding device for the mirror also acts to hold the door in its closed position, and that the handle for the door, and by means of which it is controlled, is also used to release the connection between the door and the mirror.

I claim:

1. A device of the kind described comprising a support, a receptacle connected therewith, a door for said receptacle, a mirror in said receptacle separate from said door and having its reflecting surface facing the door so as to be covered when the door is closed and to be in operative position when the door is open, the reflecting surface of the mirror when the door is open, being back of the open end of the receptacle so that the walls of the receptacle prevent the reflected light from striking the eyes of the driver so as to interfere with the driving of the automobile, but permit the light to strike the eyes of the rider sitting beside the driver.

2. A device of the kind described comprising a support, a receptacle connected therewith, a door for said receptacle, a mirror in said receptacle so as to be covered when the door is closed and to be in operative position when the door is open, said mirror having a portion free from the reflecting coating, and a light back of said mirror which shines through the mirror at the point having no reflecting coating thereon, the reflecting surface of the mirror when the door is open, being back of the open end of the receptacle so that the walls of the receptacle prevent the reflected light from striking the eyes of the driver so as to interfere with the driving of the automobile, but permit the light to strike the eyes of the rider sitting beside the driver.

3. A device of the kind described comprising a support, a receptacle connected therewith, a door for said receptacle, a mirror in said receptacle so as to be covered when the door is closed and to be in operative position when the door is open, said mirror having a portion free from the reflecting coating, a light back of said mirror which shines through the mirror at the point having no reflecting coating thereon, a switch for said light, and means controlled by the opening and closing of the door for operating said switch, the reflecting surface of the mirror when the door is open, being back of the open end of the receptacle so that the walls of the receptacle prevent the reflected light from striking the eyes of the driver so as to interfere with the driving of the automobile, but permit the light to strike the eyes of the rider sitting beside the driver.

4. A device of the kind described comprising a support, a receptacle connected therewith, a door for said receptacle, a mirror in said receptacle separate from said door and having its reflecting surface facing the door so as to be covered when the door is closed, a separable connection between said door and said mirror for causing the mirror to move with the door when the door is opened to open the receptacle, the reflecting surface of the mirror being so positioned that the reflected light does not strike the eyes of the driver so as to interfere with the driving of the automobile, but does strike the eyes of a rider sitting beside the driver.

5. A device of the kind described comprising a support, a receptacle connected therewith, a door for said receptacle, a mirror in said receptacle so as to be covered when the door is closed, a connection between said door and said mirror for causing the mirror to move with the door when the door is opened to open the receptacle, and means for releasing said connection so that when the door is opened the mirror will remain in its initial position, the reflecting surface of the mirror being so positioned that the reflected light does not strike the eyes of the driver so as to interfere with the driving of the automobile, but does strike the eyes of a rider sitting beside the driver.

6. A device of the kind described comprising a support, a receptacle connected therewith, a door for said receptacle, a mirror in said receptacle so as to be covered when the door is closed, a releasable holding device for holding said mirror in upright position in said receptacle, a latching connection between said mirror and said door whereby the holding device for the mirror acts to hold the door closed, the reflecting surface of the mirror being so positioned that the reflected light does not strike the eyes of the driver so as to interfere with the driving of the automobile, but does strike the eyes of a rider sitting beside the driver.

7. A device of the kind described comprising a support, a receptacle connected therewith, a door for said receptacle, a mirror in said receptacle so as to be covered when the door is closed, a releasable holding device for holding said mirror in upright position in said receptacle, a latching connection between said mirror and said door whereby the holding device for the mirror acts to hold the door closed, and means for disconnecting the latching connection between the door and the mirror so that the door may be opened without disturbing the mirror, the reflecting surface of the mirror being so positioned that the reflected light does not strike the eyes of the driver so as to interfere with the driving of the automobile, but does strike the eyes of a rider sitting beside the driver.

8. A device of the kind described comprising a support, a receptacle connected therewith, a door for said receptacle, a mirror in said receptacle so as to be covered when the door is closed, a releasable holding device for holding said mirror in upright position in said receptacle, a latching connection between said mirror and said door whereby the holding device for the mirror acts to hold the door closed, and means for disconnecting the latching connection between the door and the mirror so that the door may be opened without disturbing the mirror, said means comprising a controlling handle for the door, the reflecting surface of the mirror being so positioned that the reflected light does not strike the eyes of the driver so as to interfere with the driving of the automobile, but does strike the eyes of a rider sitting beside the driver.

9. A device of the kind described comprising a support, a receptacle connected therewith, a door for said receptacle, a mirror in said receptacle so as to be covered when the door is closed and to be in operative position when the door is open, a lamp at the rear of said mirror, a switch for controlling said lamp, a hinge for said door, and a part connected with the door for actuating said switch, the reflecting surface of the mirror when the door is open, being back of the open end of the receptacle so that the walls of the receptacle prevent the reflected light from striking the eyes of the driver so as to interfere with the driving of the automobile, but permit the light to strike the eyes of the rider sitting beside the driver.

10. A device of the kind described comprising a support, a receptacle connected therewith, a door for said receptacle, a mirror in said receptacle so as to be covered when the door is closed and to be in operative position when the door is open, a lamp at the rear of said mirror, a shield for shielding said lamp, and means for moving the shield to its inoperative position when the mirror is in its operative position, the receptacle and the mirror controlling the light from said light when the door is open, so that it does not strike the eyes of the driver and interfere with the driving of the automobile.

11. A device of the kind described comprising a support, a receptacle connected therewith, a door for said receptacle, a mirror in said receptacle so as to be covered when the door is closed and to be in operative position when the door is open, a lamp at the rear of said mirror, a shield for shielding said lamp, means for moving the shield to its inoperative position when the mirror is in its operative position, said means comprising a part connected with the mirror and a part connected with the shield, said latter part being moved by the movement of the mirror to move the shield to its inoperative position, the receptacle and the mirror controlling the light from said light when the door is open, so that it does not strike the eyes of the driver and interfere with the driving of the automobile.

WILLARD L. MORRISON.